(12) United States Patent
Hitomi et al.

(10) Patent No.: US 7,595,274 B2
(45) Date of Patent: Sep. 29, 2009

(54) SINTERED BODY, MAGNETIC HEAD SLIDER, AND METHOD OF MANUFACTURING SINTERED BODY

(75) Inventors: Atsushi Hitomi, Tokyo (JP); Keiko Kubo, Tokyo (JP); Yukio Kawaguchi, Tokyo (JP); Kei Sugiura, Tokyo (JP); Tsuneo Kuwahara, Tokyo (JP)

(73) Assignee: TDK Corporation, Tokyo (JP)

( * ) Notice: Subject to any disclaimer, the term of this patent is extended or adjusted under 35 U.S.C. 154(b) by 83 days.

(21) Appl. No.: 11/471,669

(22) Filed: Jun. 21, 2006

(65) Prior Publication Data

US 2006/0293167 A1 Dec. 28, 2006

(30) Foreign Application Priority Data

Jun. 27, 2005 (JP) ............................ P2005-186701
Mar. 29, 2006 (JP) ............................ P2006-091967

(51) Int. Cl.
*C04B 35/117* (2006.01)
*C04B 35/56* (2006.01)

(52) U.S. Cl. ........................................ 501/127; 501/87

(58) Field of Classification Search ................. 501/127, 501/153; 360/235.1

See application file for complete search history.

(56) References Cited

U.S. PATENT DOCUMENTS

| | | | | |
|---|---|---|---|---|
| 4,598,052 A | * | 7/1986 | Wada et al. | .................. 501/87 |
| 4,650,774 A | * | 3/1987 | Kawaguchi et al. | ............ 501/87 |
| 2005/0259363 A1 | * | 11/2005 | Kawaguchi et al. | ...... 360/235.1 |
| 2006/0002027 A1 | * | 1/2006 | Kawaguchi et al. | ...... 360/235.1 |
| 2007/0007875 A1 | | 1/2007 | Kawaguchi et al. | |

FOREIGN PATENT DOCUMENTS

| | | | |
|---|---|---|---|
| JP | A 57-82172 | | 5/1982 |
| JP | 08-152020 | * | 6/1996 |
| JP | A 2000-173034 | | 6/2000 |
| JP | A-2004-349178 | | 12/2004 |
| JP | 2005-332542 | * | 2/2005 |

OTHER PUBLICATIONS

Nakahara JP Pub. No. 08-152020, published Jun. 1996. (abstract only).*

* cited by examiner

*Primary Examiner*—Melvin C Mayes
*Assistant Examiner*—Sarah Van Oudenaren
(74) *Attorney, Agent, or Firm*—Oliff & Berridge, PLC

(57) ABSTRACT

A sintered body for a magnetic head slider, which can reduce differences in level of an air bearing surface while yielding a high strength, a magnetic head slider using the same, and a method of manufacturing a sintered body for a magnetic head slider are provided. The sintered body of the present invention is a sintered body comprising alumina crystal grains and a thin film containing carbon provided at a grain boundary between the alumina crystal grains, whereas the alumina crystal grains have an average particle size of 0.05 to 0.5 μm.

15 Claims, 12 Drawing Sheets

Fig.6
(a)
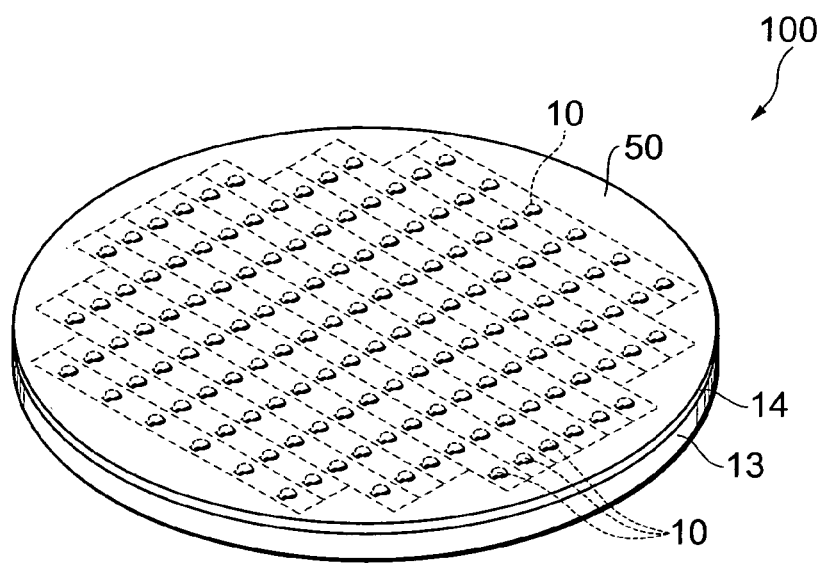
(b)
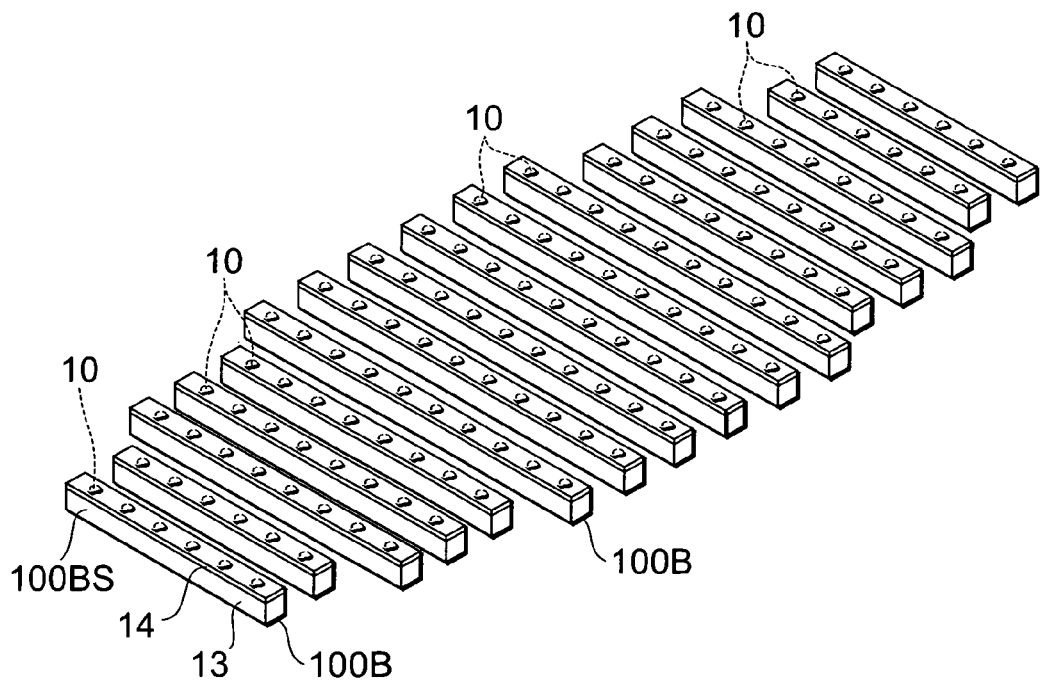

Fig.8

| | COMPOSITION (PART BY WEIGHT) | | | | SINTERING TEMP. (°C) | C POWDER PRIMARY PARTICLE SIZE (nm) | CARBON THIN FILM | AVE. ALUMINA CRYSTAL GRAIN SIZE (μm) | RATIO OF SINTERED BODY DENSITY TO TRUE DENSITY (%) | GRINDING SPEED | RIE SURFACE ROUGHNESS (nm) | IM SURFACE ROUGHNESS (nm) |
|---|---|---|---|---|---|---|---|---|---|---|---|---|
| | Al₂O₃ POWDER | C POWDER | TiC POWDER | TiO₂ POWDER | | | | | | | | |
| EXAMPLE1 | 100 | 0.5 | - | - | 1400 | 15 | YES | 0.5 | 99.6 | 155 | 2.6 | 2.5 |
| EXAMPLE2 | 100 | 1.5 | - | - | 1400 | 15 | YES | 0.4 | 99.7 | 175 | 2.4 | 2.4 |
| EXAMPLE3 | 100 | 3.1 | - | - | 1450 | 15 | YES | 0.3 | 99.6 | 185 | 2.3 | 2.3 |
| EXAMPLE4 | 100 | 0.5 | - | - | 1400 | 100 | YES | 0.5 | 99.8 | 150 | 2.6 | 2.5 |
| EXAMPLE5 | 100 | 1.5 | - | - | 1400 | 100 | YES | 0.4 | 99.7 | 170 | 2.4 | 2.4 |
| EXAMPLE6 | 100 | 3.1 | - | - | 1450 | 100 | YES | 0.3 | 99.8 | 180 | 2.3 | 2.3 |
| EXAMPLE7 | 100 | 0.8 | 56.3 | - | 1700 | 15 | YES | 0.3 | 99.9 | 230 | 0.8 | 0.8 |
| EXAMPLE8 | 100 | 2.3 | 56.3 | - | 1720 | 15 | YES | 0.25 | 99.9 | 250 | 0.7 | 0.7 |
| EXAMPLE9 | 100 | 4.0 | 56.2 | - | 1720 | 15 | YES | 0.2 | 99.9 | 260 | 0.6 | 0.6 |
| EXAMPLE10 | 100 | 2.3 | 56.2 | 6.2 | 1700 | 15 | YES | 0.25 | 99.9 | 250 | 0.8 | 0.8 |
| COMPARATIVE EXAMPLE1 | 100 | 5.3 | - | - | 1400 | 15 | NO | 3.5 | 82.1 | 70 | - | - |
| COMPARATIVE EXAMPLE2 | 100 | 5.3 | - | - | 1680 | 25 | NO | 3.9 | 99.5 | 80 | 3.5 | 3.6 |
| COMPARATIVE EXAMPLE3 | 100 | 0.5 | - | - | 1650 | 300 | NO | 4.1 | 99.1 | 82 | 4.1 | 4.1 |
| COMPARATIVE EXAMPLE4 | 100 | 0.5 | - | - | 1700 | 300 | NO | 5.5 | 99.3 | 85 | 5.2 | 5.1 |
| COMPARATIVE EXAMPLE5 | 100 | - | 56.3 | - | 1700 | - | NO | 1.1 | 99.9 | 100 | 2.0 | 2.0 |

Fig.12

| | COMPOSITION (PART BY WEIGHT) | | | | SINTERING TEMP. (°C) | C POWDER PRIMARY PARTICLE SIZE (nm) | AVE. CARBON THIN FILM THICKNESS (μm) | AVE. ALUMINA CRYSTAL GRAIN SIZE (μm) | RATIO OF SINTERED BODY DENSITY TO TRUE DENSITY (%) | GRINDING SPEED |
|---|---|---|---|---|---|---|---|---|---|---|
| | Al₂O₃ POWDER | C POWDER | TiC POWDER | TiO₂ POWDER | | | | | | |
| EXAMPLE11 | 100 | 2.0 | 40.9 | - | 1600 | 15 | 12.3 | 0.27 | 99.9 | 235 |
| EXAMPLE12 | 100 | 2.0 | 40.9 | - | 1650 | 15 | 7.9 | 0.27 | 99.9 | 240 |
| EXAMPLE13 | 100 | 2.0 | 40.9 | - | 1680 | 15 | 3.1 | 0.27 | 99.9 | 245 |

SINTERED BODY, MAGNETIC HEAD SLIDER, AND METHOD OF MANUFACTURING SINTERED BODY

BACKGROUND OF THE INVENTION

1. Field of the Invention

The present invention relates to a sintered body, a magnetic head slider, and a method of manufacturing a sintered body.

2. Related Background Art

A magnetic head slider including a thin-film magnetic head came into use in a hard disk drive for the first time in 1979. The magnetic head slider at that time has been referred to as mini slider (100% slider) in general. Thereafter, magnetic head sliders have been reducing their size so as to become the nano slider (50% slider) whose size is about 50% that of the mini slider by way of the micro slider (70% slider) whose size is about 70% that of the mini slider.

In general, the magnetic head slider comprises a multilayer body, provided on an alumina-based substrate, including a thin-film magnetic head. Such a magnetic head slider is obtained by the steps of stacking a multilayer body including a thin-film magnetic head on a substrate so as to yield a multilayer structure; then cutting the multilayer structure in parallel with the laminating direction, so as to form an exposed surface of the thin-film magnetic head; and lapping (grinding) the exposed surface, so as to yield an air bearing surface.

As disclosed in Japanese Patent Application Laid-Open No. S 57-82172, for example, a conventional magnetic head slider uses a high-strength sintered body mainly composed of alumina and titanium carbide, i.e., so-called AlTiC sintered body, as a substrate for the magnetic head slider. It has also been known to use an alumina sintered body containing about 5 to 15% of carbon as a substrate for a magnetic head slider (see, for example, Japanese Patent Application Laid-Open No. 2000-173034).

SUMMARY OF THE INVENTION

Currently, a magnetic head slider referred to as pico slider (30% slider) whose size is about 30% that of the mini slider has become mainstream. As hard disk drives cut down their size and cost, magnetic head sliders are expected to become smaller from now on, so as to shift to the femto slider (20% slider), whose size is about 20% that of the mini slider, in future.

As the magnetic head sliders become smaller, differences in level in the air bearing surface which are caused by the difference in the amount of grinding between the substrate and the multilayer body stacked on the substrate are required to be reduced in the lapping step at the time of forming the air bearing surface. Studies by the inventors have revealed that the grinding speed of alumina-based sintered bodies such as the AlTiC sintered body and alumina sintered body employed as the substrate in conventional magnetic head sliders is much lower than that of the multilayer body including the thin-film magnetic head, which makes the amount of grinding of the multilayer body much greater than the amount of grinding of the substrate at the time of lapping, thereby yielding a large difference in level. Also, while the air bearing surface is processed by dry etching in order to regulate the flying height and so forth, it has been required to further reduce the surface roughness of the surface processed by dry etching.

In view of the problems mentioned above, it is an object of the present invention to provide a sintered body yielding a grinding speed sufficiently higher than that of a conventional alumina-based sintered body while its dry-etched surface becomes fully smooth, a magnetic head slider using this sintered body, and a method of manufacturing a sintered body.

The inventors searched for an alumina-based sintered body yielding a grinding speed higher than that conventionally available while achieving a high smoothness in the dry-etched surface and, as a result, have found that a sintered body having a predetermined composition made by mixing a carbon powder having a predetermined primary particle size with an aluminum powder and then sintering the mixture exhibits a special structure, so as to yield a grinding speed sufficiently higher than that of conventional alumina-based sintered bodies such as AlTiC and alumina, while its dry-etched surface attains a smoothness much higher than that conventionally available, thereby achieving the present invention.

The present invention provides a sintered body comprising alumina crystal grains and a thin film containing carbon provided between the alumina crystal grains, the alumina crystal grains having an average particle size of 0.05 to 0.5 μm.

This sintered body yields a grinding speed much higher than that of alumina-based sintered bodies used as a sintered body for conventional magnetic head sliders and the like, while achieving a very high smoothness in the dry-etched surface.

Though it is unclear why such an alumina-based sintered body exhibits the characteristics mentioned above, the thin film of carbon seems to make the growth of alumina crystal grains sufficiently weaker than that of conventional alumina-based sintered bodies, thereby yielding a higher grinding speed while achieving a higher smoothness in the dry-etched surface.

Specifically, it will be preferred if the sintered body of the present invention contains 0.5 to 4 parts by weight of carbon when the weight of alumina in the sintered body is assumed to be 100 parts by weight. Either when carbon is more than 4 parts by weight or less than 0.5 part by weight, the thin film is hard to form, which makes it difficult to suppress the growth of alumina crystal grains.

The sintered body may further include a titanium carbide crystal grain. Preferably, in this case, the sintered body contains 30 to 70 parts by weight of titanium carbide when the weight of alumina is assumed to be 100 parts by weight. Such a sintered body also realizes a sufficient grinding speed and strength. In this case, the thin film is likely to contain titanium carbide as well.

The sintered body may further contain titania. Preferably, in this case, the sintered body contains 1 to 8 parts by weight of titania when the weight of alumina is assumed to be 100 parts by weight. Doping with titania improves sinterability, which makes it easier to yield a higher density, whereby a higher strength is obtained.

Preferably, carbon in the thin film has a mole fraction of at least 50%. Preferably, the thin film has a thickness of 1 to 20 nm, 1 to 15 nm in particular. These structures seem to fully suppress the growth of alumina crystal grains. Raising the sintering temperature tends to decrease the thickness of the thin film and increase the average particle size of alumina crystal grains.

Preferably, the sintering density is at least 95%. Such a structure achieves a sufficient strength.

The present invention provides a magnetic head slider comprising a substrate made of a sintered body; and a multilayer body, formed on the substrate, including a thin-film magnetic head, the sintered body being the sintered body of the present invention. This makes the difference between the grinding speed of the substrate using the above-mentioned sintered body and the grinding speed of the multilayer body including the thin-film magnetic head sufficiently smaller than that conventionally available. Consequently, when manufacturing the magnetic head slider, more specifically, when manufacturing the magnetic head slider by laminating a multilayer body including a thin-film magnetic head onto a substrate made of the sintered body so as to form a multilayer structure and then lapping a cross section of the multilayer structure parallel to the laminating direction, differences in level between the multilayer body and substrate are harder to occur in the air bearing surface formed by lapping. When the air bearing surface is processed by dry etching, the dry-etched surface attains a sufficient smoothness as well.

The present invention provides a method of manufacturing a sintered body comprising the steps of preparing a molded body containing an alumina powder and a carbon powder, the molded body containing 0.5 to 4 parts by weight of the carbon powder when the weight of the alumina powder is assumed to be 100 parts by weight, the carbon powder having a primary particle size of 200 nm or less; and sintering the molded body in a nonoxidizing atmosphere.

Such a manufacturing method yields a sintered body comprising alumina crystal grains and a thin film containing carbon provided between the alumina crystal grains, the alumina crystal grains having an average particle size of 0.05 to 0.5 μm as mentioned above.

Either when carbon is more than 4 parts by weight or less than 0.5 part by weight, the thin film is hard to form, which makes it difficult to suppress the growth of alumina crystal grains. When the primary particle size of the carbon powder exceeds 200 nm, on the other hand, carbon particles exist as single particles at grain boundaries, so that no thin film is formed, whereby the grain growth of alumina crystal grains is not suppressed sufficiently.

The molded body may further comprise a titanium carbide powder having a primary particle size of 500 nm or less and a titania powder having a primary particle size of 200 nm or less.

The present invention attains an alumina-based sintered body yielding a sufficient grinding speed and exhibiting a sufficient smoothness in the dry-etched surface. This can realize a magnetic head slider and the like having reduced differences in level in the air bearing surface. Consequently, a magnetic head slider and the like having a smaller size can be manufactured, for example, whereby a higher density can be achieved.

BRIEF DESCRIPTION OF THE DRAWINGS

FIGS. 6(a) and 6(b) are perspective views, subsequent to FIG. 5, for explaining the method of manufacturing a magnetic head slider in accordance with the embodiment of the present invention;

FIG. 8 is a table showing compositions and characteristics of magnetic head substrates in accordance with Examples 1 to 6 and Comparative Examples 1 and 2;

FIG. 12 is a table showing conditions and characteristics of Examples 11 to 13.

DESCRIPTION OF THE PREFERRED EMBODIMENTS

In the following, preferred embodiments of the present invention will be explained in detail with reference to the accompanying drawings. In the description of the drawings, constituents identical or equivalent to each other will be referred to with numerals identical to each other without repeating their overlapping descriptions.

Sintered Body

First, the alumina-based sintered body in accordance with an embodiment will be explained. The sintered body in accordance with this embodiment is a sintered body containing alumina ($Al_2O_3$) and carbon (C), and further contains titanium carbide (TiC) and/or titania ($TiO_2$) if necessary.

The carbon content in the sintered body is preferably 0.5 to 4 parts by weight when the weight of alumina is assumed to be 100 parts by weight. In the case containing titanium carbide, the titanium carbide content is preferably 30 to 70 parts by weight when the weight of alumina is assumed to be 100 parts by weight. In the case containing titania, the titania content is preferably 1 to 8 parts by weight when the weight of alumina is assumed to be 100 parts by weight.

Figure 1:
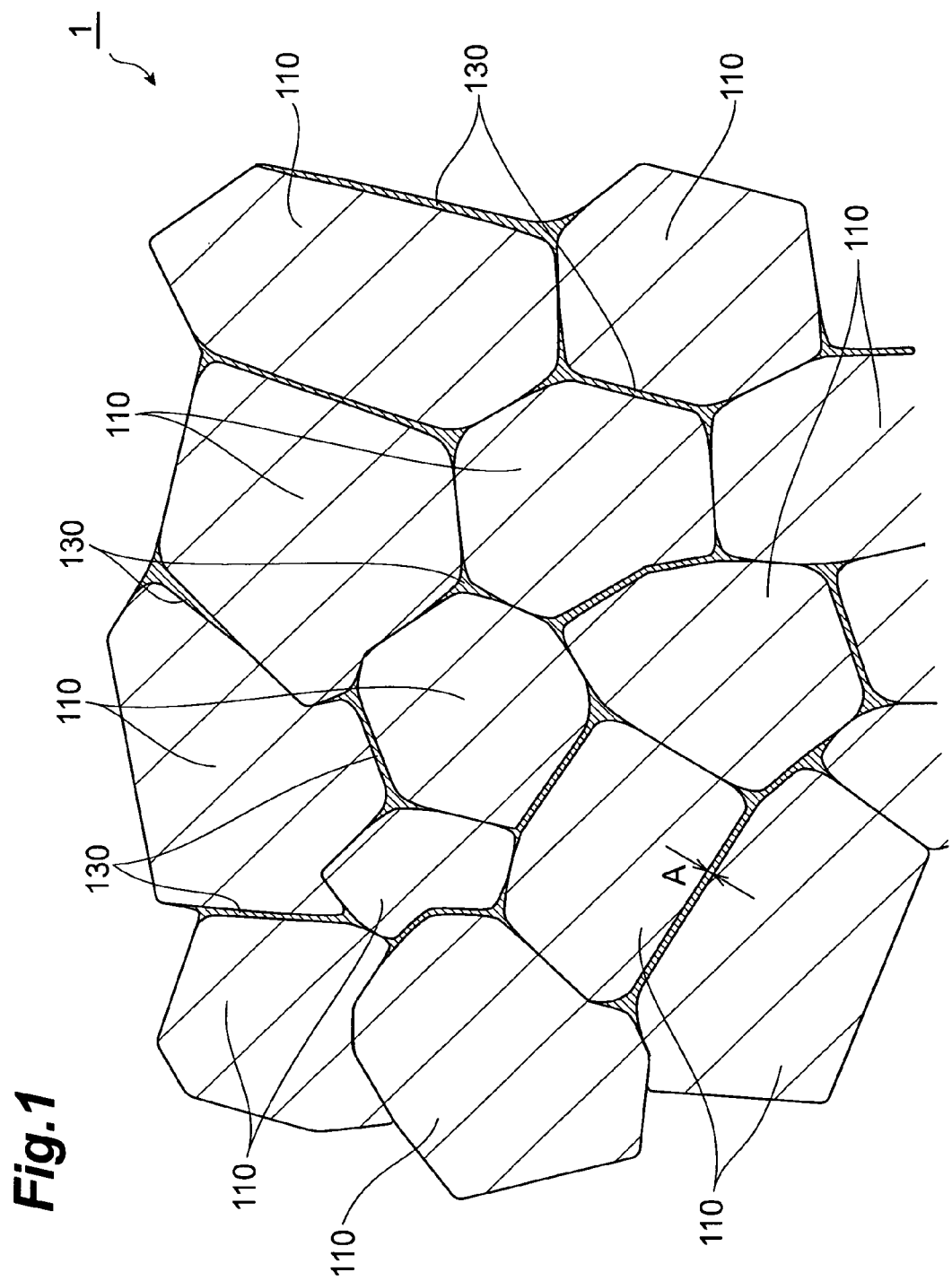
FIG. 1 is an example of sectional views of the sintered body for a magnetic head slider in accordance with an embodiment of the present invention.

The structure of the sintered body in accordance with this embodiment will now be explained with reference to FIGS. 1 and 2. FIG. 1 is a schematic sectional view showing a sintered body 1 containing alumina and carbon, whereas FIG. 2 is a schematic sectional view showing a sintered body 2 containing alumina, carbon, and titanium carbide.

Figure 2:
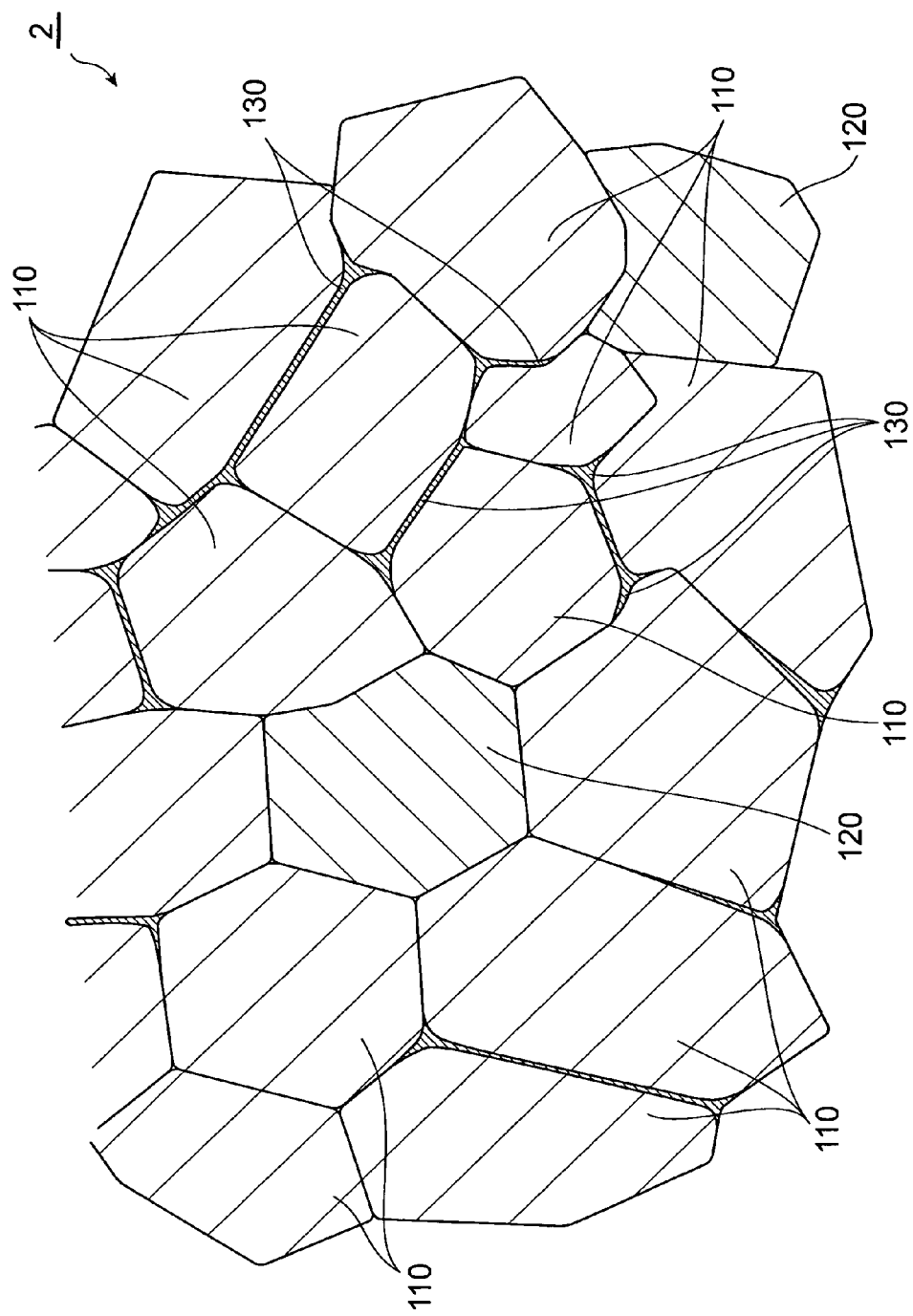
FIG. 2 is another example of sectional views of the sintered body for a magnetic head slider in accordance with an embodiment of the present invention.

Alumina forms alumina crystal grains 110 as shown in FIGS. 1 and 2, whereas titanium carbide forms titanium carbide crystal grains 120 as shown in FIG. 2.

Here, the alumina crystal grains 110 have an average particle size of 0.05 to 0.5 μm. The average particle size of crystal grains can be determined as follows, for example. First, a sintered body is ruptured, whereas the resulting rupture cross section is processed into a mirror surface and is thermally etched at (sintering temperature—100)° C. Thus obtained surface is photographed by a scanning electron microscope under a magnification of 30,000×, and lines are radially drawn on the resulting photograph. Specifically, a vertical line, a horizontal line, and two diagonal lines (yielding a total length of 30 mm) are drawn so as to pass the center of a rectangular photograph of 9 mm (L)×12 mm (W). Intersections at which the lines cross crystal boundaries are counted, and (total length of lines (mm))/(total number of intersections×photographing magnification) is calculated, whereby average particle sizes of alumina crystal grains and titanium carbide crystal grains can be determined.

In the sintered body in accordance with this embodiment, a thin film 130 containing carbon exists between the alumina crystal grains 110. In the thin film 130, the average value of thickness in parts held between two alumina crystal grains 110, i.e., the thickness A of the thin film 130, is about 1 to 20 nm, for example.

Though variable depending on whether doped with titanium carbide or not and whether doped with titania or not, the molar concentration of carbon in the thin film is preferably 50% or greater, 80% or greater in particular. When titanium carbide is added, titanium carbide forms titanium carbide crystal grains as shown in FIG. 2, and may also exist in the thin film 130.

As shown in FIG. 2, the thin film 130 containing carbon is hardly formed between the alumina crystal grain 110 and titanium carbide crystal grain 120. The average particle size of the titanium carbide particles 120 is about 0.05 to 0.5 μm, for example.

Preferably, the sintering density of the sintered body in accordance with this embodiment is at least 95%.

This sintered body may contain other ingredients to such an extent that its characteristics are not affected thereby.

The above-mentioned sintered body yields a grinding speed much higher than that in alumina-based sintered bodies used for conventional magnetic head sliders and the like, while achieving a very high smoothness in the dry-etched surface.

Though it is unclear why such an alumina-based sintered body exhibits the characteristics mentioned above, the thin film 130 of carbon seems to make the growth of alumina crystal grains sufficiently weaker than that of conventional alumina-based sintered bodies, thereby yielding a higher grinding speed while achieving a higher smoothness in the dry-etched surface. The smoothness in the surface ground by lapping is also high.

Method of Manufacturing a Sintered Body

A first method of manufacturing such an alumina-based sintered body will now be explained.

First, an alumina powder, a carbon powder, and a titanium carbide powder and titania powder if necessary, are prepared.

Here, the average primary particle size of the alumina powder as a material is 500 nm or less, preferably 5 to 500 nm, more preferably 100 to 400 nm.

The average primary particle size of the carbon powder is 200 nm or less, preferably 100 nm or less. As the carbon powder, powders of carbon such as carbon black and ethylene black having an average primary particle size on the order of 5 to 200 nm can be used, for example. When the primary particle size of the carbon powder exceeds 200 nm, on the other hand, carbon particles exist as single particles at grain boundaries, so that the thin film 130 is not formed, whereby the grain growth of alumina crystal grains is not suppressed sufficiently.

The average primary particle size of the titanium carbide powder is 500 nm or less, preferably 5 to 500 nm, more preferably 100 nm to 400 nm. The titanium carbide powder may contain carbon.

Preferably, the average primary particle size of the titania powder is 200 nm or less.

These powders are mixed in an organic solvent such as ethanol, IPA, or 95% denatured ethanol, for example, so as to yield a mixed powder. When titanium carbide is used, water cannot be used as a solvent, since water chemically reacts with titanium carbide, thereby oxidizing the titanium carbide powder.

Here, the mixed powder is doped with 0.5 to 4 parts by weight of the carbon powder when the total weight of alumina is assumed to be 100 parts by weight. Either when the carbon content is less than 0.5 part by weight or more than 5 parts by weight, the thin film 130 is hard to form, which makes it difficult to fully suppress the average particle size of alumina crystal grains. With respect to 100 parts by weight of alumina, 30 to 70 parts by weight of the titanium carbide powder if necessary and 1 to 8 parts by weight of the titania powder if necessary are preferably compounded.

Preferably, the powders are mixed in a ball mill or attritor. It will be preferred if the powders are mixed for about 10 to 100 hours. As a mixing medium in the ball mill or attritor, alumina balls having a diameter of about 1 to 20 mm, for example, are preferably used.

Subsequently, the mixed powder is granulated by spraying. Here, it will be sufficient if the mixed powder is spray-dried in a hot wind of an inert gas such as nitrogen or argon substantially free of oxygen at a temperature of about 60 to 200° C., for example. This forms a granule of the mixed powder having the composition mentioned above. Here, the grain size of the granule is preferably about 50 to 200 μm, for example.

Then, the above-mentioned organic solvent is added as necessary, so as to adjust the liquid content of the granule, such that about 0.1 to 10 wt % of the organic solvent is contained in the granule. Examples of the organic solvent used for adjusting the liquid content include organic solvents such as ethanol, IPA, and 95% denatured ethanol. The organic solvent used when mixing the powders is usually employed. If used as a solvent, water will chemically react with titanium carbide, thereby oxidizing the titanium carbide powder. Therefore, water cannot be used when the titanium carbide powder is included.

Next, a predetermined mold is filled with the granule, and primary molding is carried out by cold pressing, so as to yield a molded body. Here, it will be sufficient if a mold made of a metal or carbon having an inner diameter of 150 nm for forming a disk is filled with the granule, for example, and cold pressing is effected at a pressure of about 5 to 15 MPa (about 50 to 150 kgf/cm$^2$), for example.

Subsequently, thus obtained molded body is hot-pressed, so as to yield a sintered body. Here, for example, the sintering temperature is 1,200 to 1,750° C., pressure is 10 to 50 MPa (about 100 to 500 kgf/cm$^2$), and the atmosphere is a nonoxidizing atmosphere such as vacuum, nitrogen, or argon etc. The nonoxidizing atmosphere is used in order to restrain carbon and titanium carbide from oxidizing. For molding the mixed powder, it will be preferred if a mold made of carbon is used. The sintering time of the molded body is preferably about 1 to 3 hours. Preferably, the sintering temperature is 1,200 to 1,500° C. for the alumina/carbon system, and 1,500 to 1,750° C. for the alumina/titanium carbide/carbon system.

This completes a sintered body. The form of the sintered body is not restricted in particular, whereas its examples include a disk-shaped substrate having a diameter of 6 inches and a thickness of 2.5 mm and rectangular substrates.

A second method of manufacturing such an alumina-based sintered body will now be explained.

Though the above-mentioned first manufacturing method prepares a carbon powder having a primary particle size of 200 nm or less beforehand and mixes it with an alumina powder and the like, the second manufacturing method manufactures a carbon powder by using an organic matter instead. Specifically, an alumina powder and an organic matter are initially mixed, so as to yield a mixture. Here, the organic matter is not limited in particular, whereas its examples include polyvinyl alcohol, acrylic resins, and butyral resins. The mixture may be doped with a titanium carbide powder, a titania powder, and the like if necessary.

Subsequently, this mixture is heat-treated in a nonoxidizing atmosphere such as vacuum or nitrogen, so as to carbonize the organic matter in the mixture. Here, the carbonizing condition can arbitrarily be set as appropriate depending on the species of the organic matter and the like. For example, heat treatment for about 5 hours at 600° C. in a vacuum drying furnace or the like can yield a mixed powder containing alumina and carbon, and titanium carbide, titania, and the like if necessary.

It will be sufficient if this mixed powder is subsequently molded and sintered as in the first manufacturing method.

Manufacturing with an organic matter as such can increase the degree of dispersion of the carbon powder, thereby making it easier to form the thin film uniformly.

Though the molding is preferably performed after carbonizing the organic matter as mentioned above in order to yield a dense sintered body, the organic matter may be carbonized after the molding.

Specifically, after yielding a mixture containing the alumina powder, organic matter, and the like and the titanium carbide powder and titania powder if necessary, this mixture is molded as in the first manufacturing method before being carbonized. Then, the molded body of the mixture containing the organic matter is heat-treated as mentioned above, so as to carbonize the organic matter, thereby manufacturing a carbon powder having a primary particle size of 200 nm or less, by which a molded body containing the alumina powder, carbon powder, and the like can be obtained.

It will be sufficient in the second manufacturing method if respective concentrations of powders at the time of mixing the alumina powder and organic powder, and the titanium carbide powder, titania powder, and the like if necessary are set beforehand such that amounts of the alumina powder, carbon powder, titanium carbide powder, and titania powder in the mixed powder or molded body after carbonizing the mixture attain their contents defined in the first manufacturing method. This yields a molded body having a composition similar to that in the first manufacturing method.

Magnetic Head Slider

A magnetic head slider using the above-mentioned alumina-based sintered body will now be explained with reference to FIG. 3.

The magnetic head slider 11 in accordance with an embodiment of the present invention includes a thin-film magnetic head 10, and is mounted to a hard disk drive (not depicted) equipped with a hard disk. This hard disk drive is configured such that the thin-film magnetic head 10 records/reads magnetic information onto/from a recording surface of the hard disk rotated at a high speed.

The magnetic head slider 11 in accordance with this embodiment has a substantially rectangular parallelepiped form. In FIG. 3, the surface of the magnetic head slider 11 on the front side is a recording-medium-opposing surface disposed so as to oppose the recording surface of the hard disk, and is referred to as an air bearing surface (ABS) S. The air bearing surface is formed with a groove 11a extending in a direction orthogonal to the track width.

When the hard disk rotates, an airflow accompanying the rotation levitates the magnetic head slider 11, whereby the air bearing surface S moves away from the recording surface of the hard disk. The air bearing surface S may be coated with DLC (Diamond Like Carbon) and the like.

The magnetic head slider 11 comprises a substrate 13 made of the above-mentioned sintered body and a multilayer body 14, formed on the substrate 13, including the thin-film magnetic head 10. More specifically, in this embodiment, the substrate 13 has a rectangular parallelepiped form, whereas the multilayer body 14 is formed on a side face of the substrate 13.

The upper face 14a of the multilayer body 14 forms an end face of the magnetic head slider 11, whereas recording pads 18a, 18b and reading pads 19a, 19b connected to the thin-film magnetic head 10 are attached to the upper face 14a of the multilayer body 14. The thin-film magnetic head 10 is provided within the multilayer body 14 while partly exposing itself out of the air bearing surface S. In FIG. 3, the thin-film magnetic head 10 buried within the multilayer body 14 is illustrated by solid lines for easier recognition.

Such a magnetic head slider 11 is mounted to a gimbal 12, and is connected to an unshown suspension arm, so as to construct a head gimbal assembly.

Figure 3:
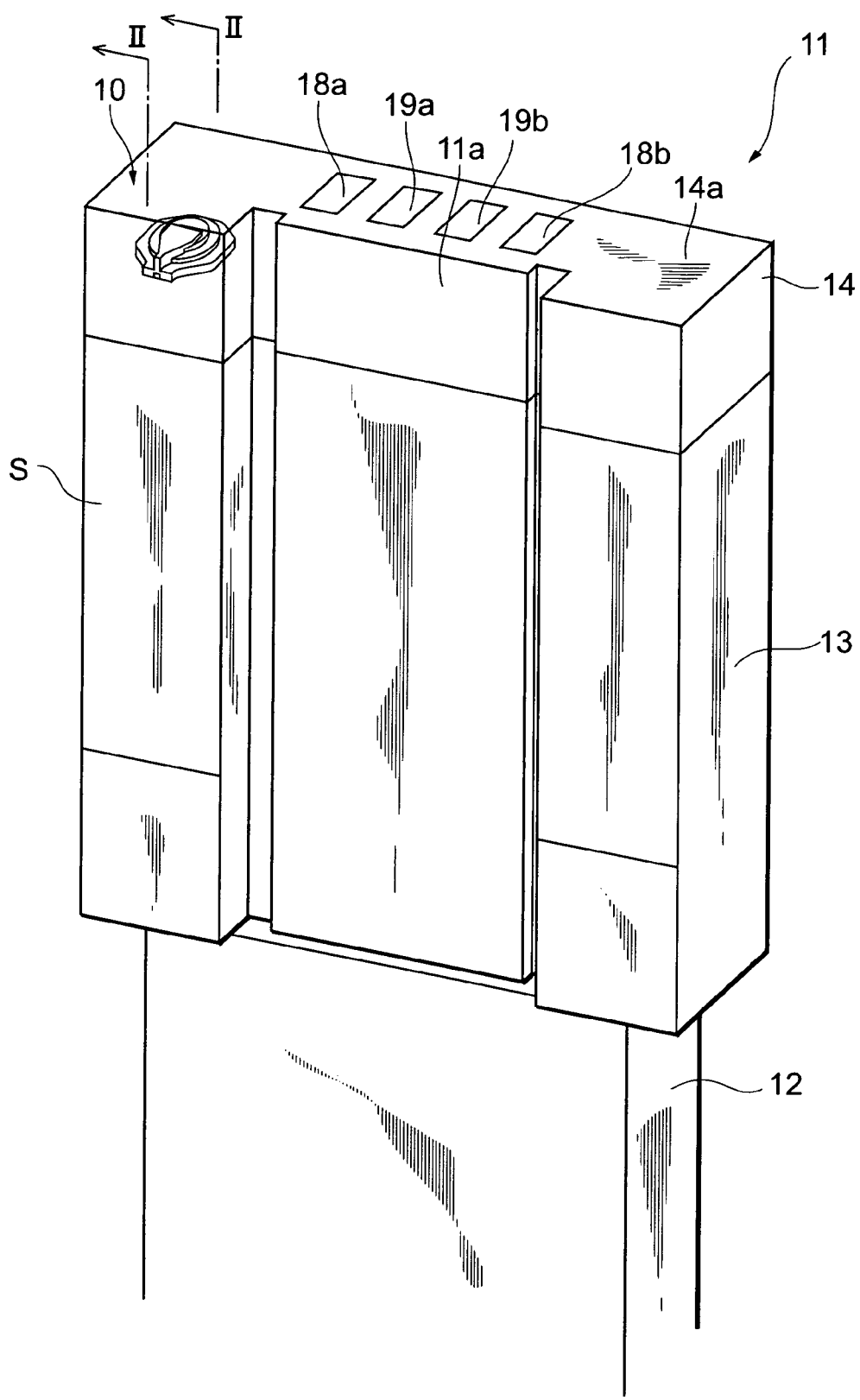
FIG. 3 is a perspective view of the magnetic head slider in accordance with an embodiment of the present invention.
Figure 4:
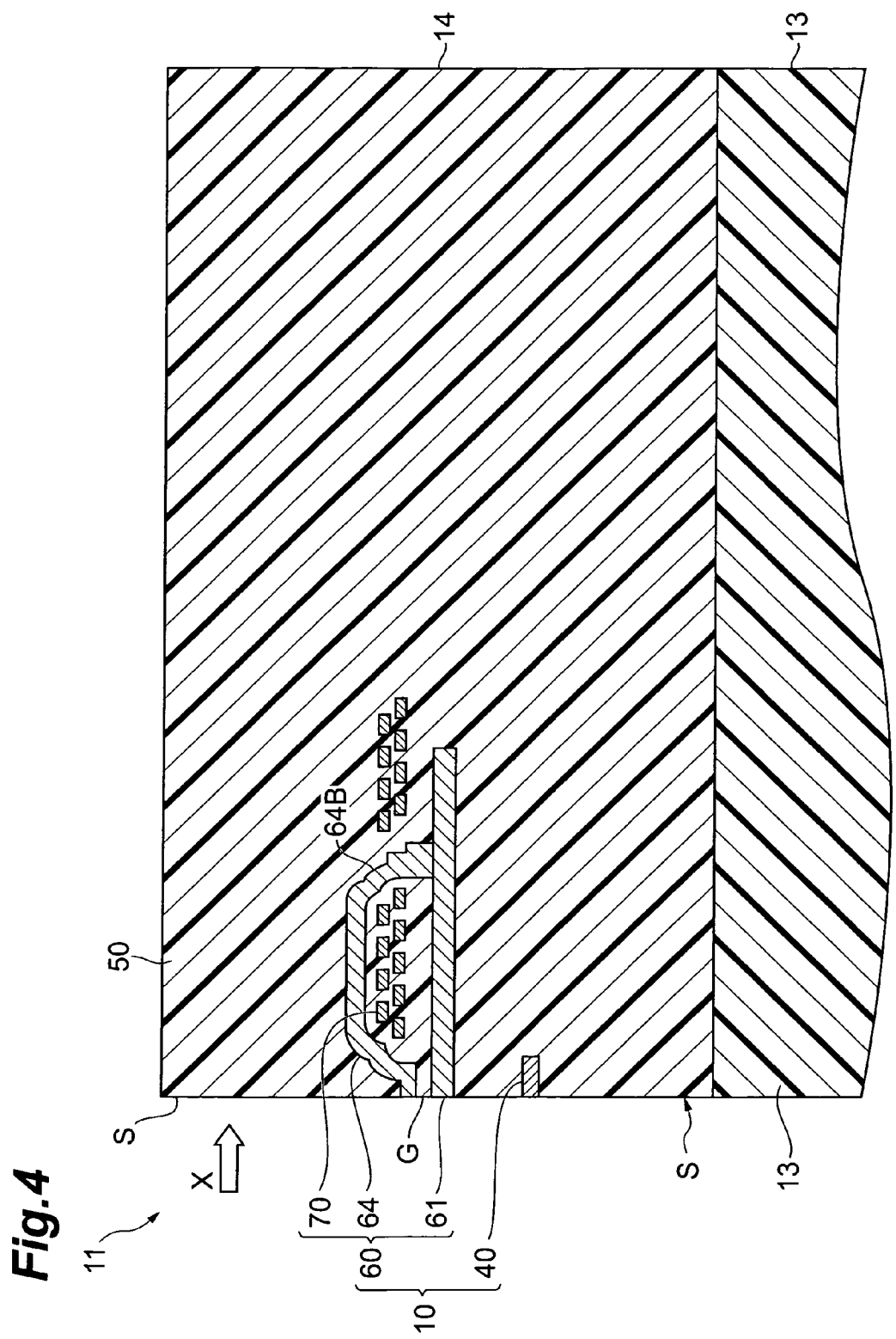
FIG. 4 is a sectional view taken along the line II-II of the magnetic head slider in FIG. 1.

FIG. 4 is a schematic sectional view of the magnetic head slider 11 taken along a direction perpendicular to both the air bearing surface S and track width (i.e., a schematic sectional view taken along the line II-II of FIG. 3). As mentioned above, the magnetic head slider 11 comprises the substantially rectangular sheet-like substrate 13 and the multilayer body 14 stacked on a side face of the substrate 13. The multilayer body 14 comprises the thin-film magnetic head 10 and a coating layer 50 surrounding the thin-film magnetic head 10.

The thin-film magnetic head 10 comprises, successively from the side closer to the substrate 13, a GMR (Giant MagnetoResistive) device 40 acting as a reading device for reading magnetic information from the hard disk and an inductive electromagnetic transducer 60 acting as a writing device for writing magnetic information onto the hard disk, and forms a so-called combination thin-film magnetic head.

The electromagnetic transducer 60, which employs a so-called in-plane recording scheme, comprises a lower magnetic pole 61 and an upper magnetic pole 64 in succession from the substrate 13 side, and further comprises a thin-film coil 70.

The end parts of the lower magnetic pole 61 and upper magnetic pole 64 on the air bearing surface S side are exposed at the air bearing surface S, whereas the respective exposed parts of the lower magnetic pole 61 and upper magnetic pole 64 are separated from each other by a predetermined distance, so as to form a recording gap G therebetween. On the other hand, the end part 64B of the upper magnetic pole 64 remote from the air bearing surface S is bent toward the lower magnetic pole 61 and is magnetically connected to the end part of the lower magnetic pole 61 remote from the air bearing surface S. As a consequence, the upper magnetic pole 64 and lower magnetic pole 61 form a magnetic circuit incorporating the gap G therewithin.

The thin-film coil 70 is disposed so as to surround the end part 64B of the upper magnetic pole 64, and generates a magnetic field in the recording gap G by electromagnetic inductance, thereby recording magnetic information onto the recording surface of the hard disk.

The GMR device 40 has an unshown multilayer structure and is exposed at the air bearing surface S, so as to detect changes in the magnetic field from the hard disk by utilizing a magnetoresistive effect, thereby reading the magnetic information.

The insulative coating layer 50 separates the GMR device 40 from the electromagnetic transducer 50, and the upper magnetic pole 64 from the lower magnetic pole 61. The thin-film magnetic head 10 itself is also covered with the coating layer 50 except for the air bearing surface S. The coating layer 50 is mainly formed from an insulating material such as alumina. Specifically, an alumina layer formed by sputtering or the like is usually used. Such an alumina layer typically has an amorphous structure.

The thin-film magnetic head 10 may be of perpendicular recording type instead of in-plane recording type. An AMR (Anisotropic MagnetoResistive) device using an anisotropic magnetoresistive effect, a TMR (Tunneling MagnetoResistive) device using a magnetoresistive effect occurring in a tunnel junction, or the like may be utilized in place of the GMR device 40.

The coating layer 50 may further include therewithin a magnetic layer or the like which magnetically insulates the GMR device 40 from the electromagnetic transducer 60.

A method of manufacturing the foregoing magnetic head slider 11 will now be explained.

Figure 5:
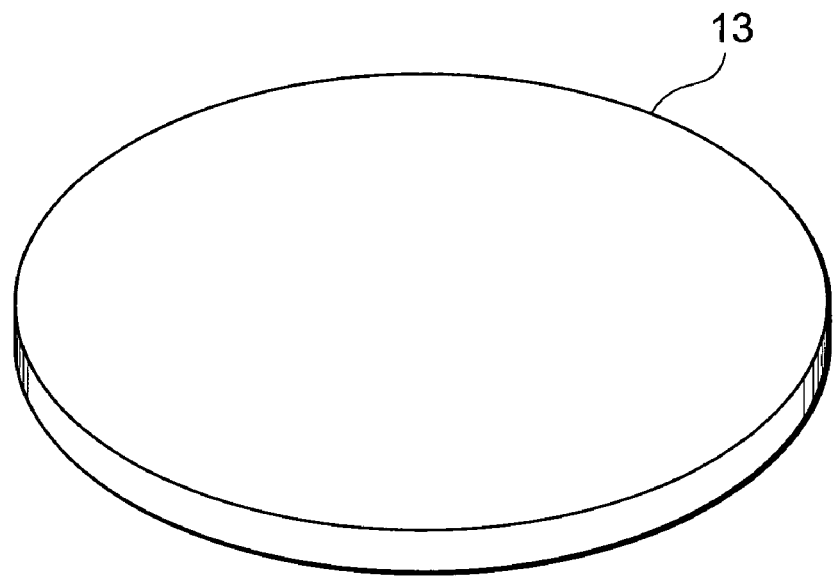
FIG. 5 is a perspective view for explaining the method of manufacturing a magnetic head slider in accordance with an embodiment of the present invention.

First, as, mentioned above, a substrate 13 in which the above-mentioned sintered body is formed into a disk-shaped wafer is prepared as shown in FIG. 5. Next, as shown in FIG. 6(a), a multilayer body 14 including thin-film magnetic heads 10 and a coating layer 50 is laminated on the substrate 13 by a known technique. Here, the multilayer body 14 is formed such that a number of thin-film magnetic heads 10 are arranged in a matrix in the multilayer body 14.

Subsequently, the substrate 13 having the multilayer body 14 stacked thereon is cut into predetermined forms/sizes. Here, cutting as indicated by broken lines in FIG. 6(a), for example, forms a bar 100B in which a plurality of thin-film magnetic heads 10 are arranged in a row while being exposed at side faces 100BS as shown in FIG. 6(b).

Then, a so-called lapping step, which forms the air bearing surface S by grinding the side face 100BS of each bar 100B, is performed. The lapping step grinds the substrate 13 and the multilayer body 14 stacked thereon simultaneously in a direction (direction of arrow X in FIG. 4) intersecting the laminating direction.

In this embodiment, the substrate 13 is made of the above-mentioned sintered body. Therefore, the grinding speed of the substrate 13 is sufficiently higher than that of the conventional substrate made of an AlTiC sintered body or the like, and is on a par with the multilayer body 14 including the thin-film magnetic heads 10.

Figure 7:
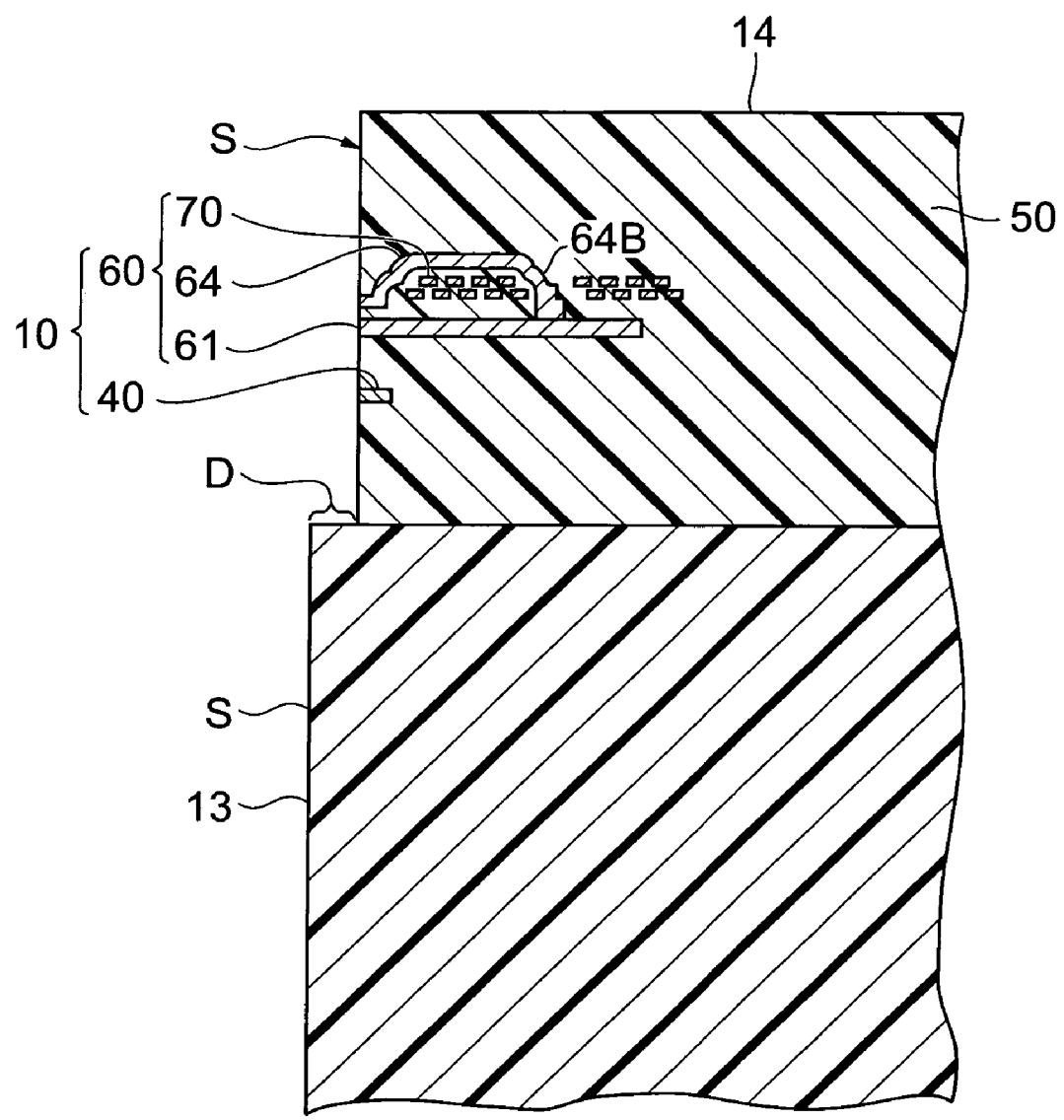
FIG. 7 is a sectional conceptual view showing a state where a bar of FIG. 6(b) is ground.

Therefore, at the time of lapping, the difference in amount of grinding between the multilayer body 14 and the substrate 13 becomes very small, so that the difference in level D (see FIG. 7) between the multilayer body 14 and the substrate 13 becomes much smaller than the conventional one. This allows the air bearing surface S to attain a substantially flat state, for example. Specifically, the difference in level D can be reduced to 1.2 nm or less, for example. If necessary, the air bearing surface before or after lapping is formed with a groove 11a by dry etching such as reactive ion etching or ion milling as shown in FIG. 3. Here, since the substrate 13 is the above-mentioned sintered body, the dry-etched surface attains a very high smoothness, whereby a surface roughness Ra<3 nm is achievable, for example.

Therefore, femto or smaller sliders can be made favorably, which makes it easier to achieve recording at a higher density. The substrate 13 in this embodiment has a sufficient strength and thus is fully reliable. Though used for a magnetic head slider in the foregoing description, the alumina-based sintered body of the present invention can also be employed for other purposes. For example, such a sintered body can be employed in various sensor heads using a thin-film technique.

EXAMPLES

The present invention will now be explained in detail with reference to examples and comparative examples, though the present invention is not restricted to these examples at all.

In the examples, a plurality of sintered bodies which were different from each other were made, and each of them was subjected to determination of whether a carbon thin film exists or not by observing a sintered body cross section with an electron microscope, measurement of the average particle size of alumina crystal grains, measurement of lapping (grinding) speed, measurement of surface roughness in the dry-etched surface, and measurement of the sintering density indicative of strength.

Examples 1 to 3

Predetermined amounts of an alumina powder (having an average primary particle size of 320 nm) and a carbon powder (carbon black having an average primary particle size of 15 nm) were weighed, and were pulverized for 30 minutes together with IPA (isopropyl alcohol having a boiling point of 82.4° C.) in a ball mill, so as to be mixed. Thereafter, thus obtained mixture was granulated by spraying in nitrogen at 150° C., so as to yield a granule.

The alumina powder and carbon powder were mixed in such concentrations as to satisfy the following conditions in the granule. Namely, assuming that the weight of the alumina powder was 100 parts by weight, the weight of the carbon powder was 0.5 part by weight in Example 1, 1.5 parts by weight in Example 2, and 3.1 parts by weight in Example 3.

Subsequently, thus obtained granule was primarily molded at about 0.5 MPa (50 kgf/cm$^2$). The resulting molded body was sintered by hot pressing in a vacuum atmosphere for 1 hour at a pressing pressure of about 30 MPa (about 300 kgf/cm$^2$), whereby a sintered body was obtained for each example. Here, the sintering temperature was 1,400° C. in Examples 1 and 2, and 1,450° C. in Example 3. Each of thus obtained sintered bodies was cut into a slice of about 20×20× 1.8 mm, which was then lapped with a single-side grinder while using a slurry containing diamond particles having a diameter of 0.1 μm. The grinding condition was such that the tin plate rotating speed was 37.5 rpm, the load was 2,550 g, the Oscar motor rotating speed was 55 rpm, and the grinding time was 10 minutes. The thickness of each piece was measured before and after grinding, and the change in thickness was divided by the grinding time, whereby the grinding speed was acquired in each example. Also, a cross section of the sintered body was observed with TEM, so as to determine the average particle size of alumina crystal grains by the above-mentioned method, and see whether or not a carbon-containing thin film exists at grain boundaries between alumina crystal grains. Further, the apparent density of the sintered body was measured, its true density was determined by a pycnometer method after fully pulverizing the sintered body, and the sintering density was determined by dividing the apparent density of the sintered body by the true density. Furthermore, the slice of the sintered body was processed by RIE and ion milling, and the surface roughness Ra in the processed surface was measured.

Comparative Examples 1 and 2

Comparative Example 1 was the same as Example 1 except that the weight of carbon was 5.3 parts by weight when the weight of alumina was assumed to be 100 parts by weight. Comparative Example 2 was the same as Comparative Example 1 except that carbon black having an average primary particle size of 25 nm was used as the carbon powder and that the sintering temperature was 1,680° C.

Examples 4 to 6

Examples 4 to 6 were the same as Examples 1 to 3 except that carbon black having an average primary particle size of 100 nm was used as the carbon powder.

Comparative Examples 3 and 4

Comparative Example 3 was the same as Example 1 except that carbon black having an average primary particle size of 300 nm was used as the carbon powder and that the sintering temperature was 1,650° C. Comparative Example 4 was the same as Comparative Example 3 except that the sintering temperature was 1,700° C.

Examples 7 to 9

Examples 7 to 9 were the same as Example 1 except that the alumina powder, the carbon powder, and a titanium carbide powder (having an average primary particle size of 300 nm) were mixed and that the sintering temperature and mixing ratio were as follows. In Example 7, when the weight of the alumina powder was assumed to be 100 parts by weight, the weight of the carbon powder was 0.8 part by weight, and the weight of the titanium carbide powder was 56.3 parts by weight, whereas the sintering temperature was 1,700° C. In Example 8, the weight of the carbon powder was 2.3 parts by weight, the weight of the titanium carbide powder was 56.3 parts by weight, and the sintering temperature was 1,720° C. In Example 9, the weight of the carbon powder was 4.0 parts by weight, the weight of the titanium carbide powder was 56.2 parts by weight, and the sintering temperature was 1,720° C. Though the titanium carbide powder inevitably contains carbon by about 0.1% of the weight of titanium carbide, this amount is too small to be problematic.

Comparative Example 5

Comparative Example 5 was the same as Example 7 except that no carbon powder was added.

Example 10

Example 10 was the same as Example 7 except that the alumina powder, the carbon powder, a titania powder (having an average primary particle size of 100 nm), and the titanium carbide powder were mixed and that, when the weight of the alumina powder was assumed to be 100 parts by weight, the weight of the carbon powder was 2.3 parts by weight, the weight of the titanium carbide powder was 56.2 parts by weight, and the weight of the titania powder was 6.2 parts by weight.

FIG. 8 shows these conditions and results as a table. Taking the grinding speed in Comparative Example 5 as 100, each grinding speed was expressed as a ratio to the grinding speed in Comparative Example 5. Here, the grinding speed of Comparative Example 5 was about 1.7 μm/10 min.

Sintered bodies having a thin film between alumina crystal grains and yielding an alumina crystal grain size of 0.05 to 0.5 μm were obtained when the weight of the carbon powder was 0.5 to 4 parts by weight while the primary particle size of the carbon powder was 200 nm or less as in Examples 1 to 10. These sintered bodies yielded a grinding speed sufficiently higher than that in Comparative Examples, a sufficiently small surface roughness Ra of the surface processed by RIE and ion milling, and a sufficient value of sintering density.

Figure 9:
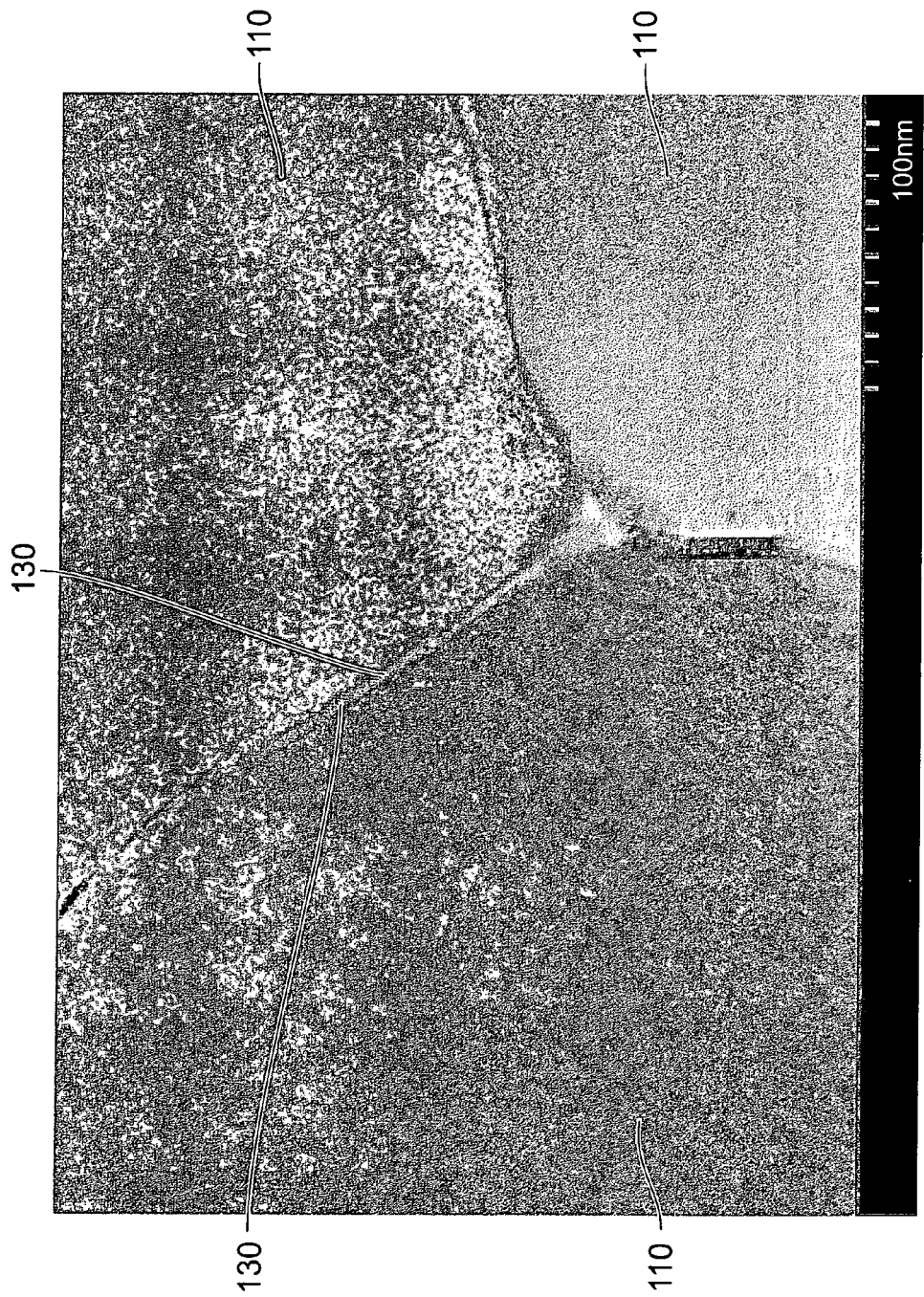
FIG. 9 is an SEM photograph of the magnetic head substrate in accordance with Example 1.

When the above-mentioned conditions were not satisfied, by contrast, sufficient grinding speed, smoothness in the processed surface, and sintering density could not be achieved. In Comparative Examples 1 and 2 in which the amount of the carbon powder was greater than that in Examples 1 to 9, for example, no thin film was formed, the growth of alumina crystal grains was not fully suppressed, and the grinding speed and the roughness in the processed surface were not favorable. In particular, it was difficult for Comparative Example 1 to mix a very fine, bulky carbon powder with an alumina powder at a high concentration, whereby a low density was obtained. Though the density was not so low in Comparative Example 2 since it was sintered at a relatively high temperature, no thin film was formed, whereby the growth of alumina crystal grains was not fully suppressed. Comparative Examples 3 and 4, in which the primary particle size of the carbon powder was 300 nm, formed no thin film and did not suppress the alumina crystal grain growth, whereas the grinding speed and the roughness in the processed surface were unfavorable. Comparative Example 5, which did not contain the carbon powder, could not suppress the alumina grain growth sufficiently, whereas its grinding speed was insufficient. FIG. 9 shows a cross-sectional SEM photograph of a slice of Example 1.

Examples 11 to 13

Figure 10:
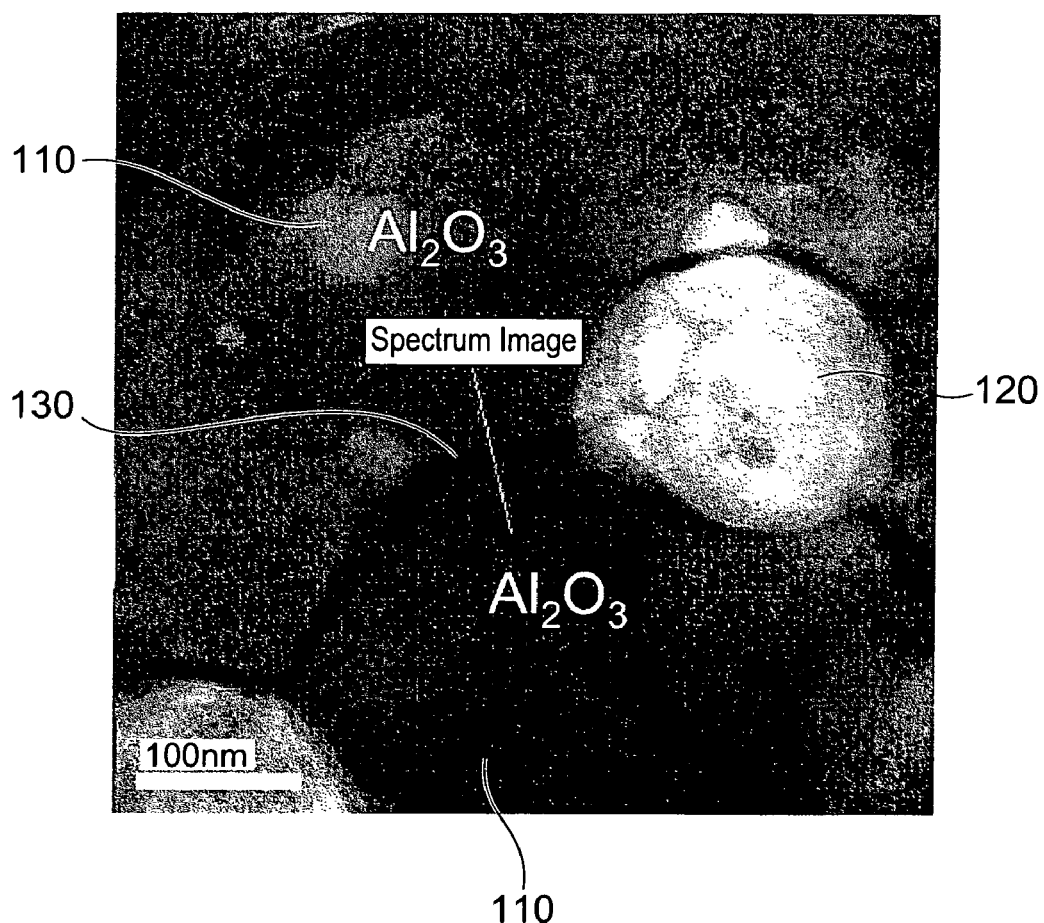
FIG. 10 is an ADF-STEM photograph of a surface in Example 11.
Figure 11:
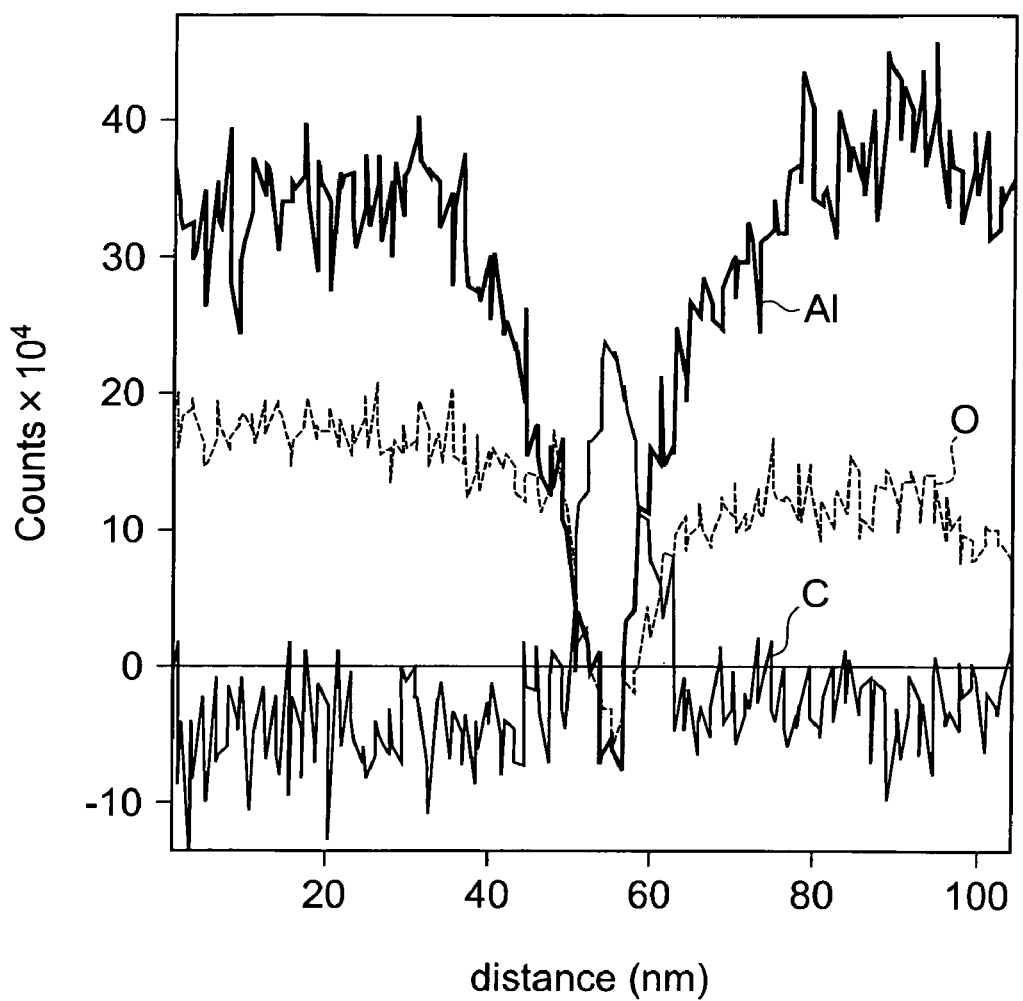
FIG. 11 is a graph showing composition analysis curves obtained by EELS along a transverse line of the thin film 130 in FIG. 10.

Examples 11 to 13 were the same as Example 1 except that the carbon powder was 2.0 parts by weight and the titanium carbide powder was 40.9 parts by weight with respect to 100 parts by weight of the alumina powder and that the sintering temperature was 1,600° C., 1,650° C., and 1,680° C., respectively. Each sintered sample was ion-milled, and thus obtained surface was measured by STEM-EELS (JEM-2100F/Gatan-Enfina). FIG. 10 shows an ADF-STEM photograph of the surface in Example 11, whereas FIG. 11 is a graph showing composition analysis curves obtained by EELS along a transverse line of the thin film 130 in FIG. 10. Contents of Al and O other than carbon are seen to be low in the thin film 130. Since the luminance of the thin film is low in the STEM photograph, the Ti content is also seen to be low in the thin film 130.

Further, the thickness of each thin film in the STEM photograph was measured at 5 points, and thus obtained values were averaged, so as to determine the average thickness. FIG. 12 shows the average particle size of alumina crystal grains, the ratio of the density of the sintered body to its true density, and the grinding speed. The sintered bodies in accordance with these examples showed sufficient characteristics as well.

What is claimed is:

1. A sintered body comprising:
    alumina crystal grains; and
    a thin film containing carbon provided between the alumina crystal grains, wherein
    the alumina crystal grains have an average particle size of 0.05 to 0.5 μm,
    the sintered body exhibits a sintering density of at least 95%, and
    the sintered body contains 0.5 to 4 parts by weight of carbon by weight of carbon to 100 parts by weight of alumina in the sintered body.

2. A sintered body according to claim 1, further comprising a titanium carbide crystal grain.

3. A sintered body according to claim 2, further containing titanium carbide in the thin film.

4. A sintered body according to claim 1, further comprising titania in the sintered body.

5. A sintered body according to claim 1, wherein carbon in the thin film has a mole fraction of at least 50%.

6. A sintered body according to claim 1, wherein the thin film has a thickness of 1 to 20 nm.

7. A sintered body according to claim 1, used for a magnetic head slider.

8. A magnetic head slider comprising a substrate made of a sintered body; and a multilayer body, formed on the substrate, including a thin-film magnetic head, the sintered body being the sintered body according to claim 1.

9. A method of manufacturing the sintered body of claim 1 comprising the steps of preparing a molded body containing an alumina powder and a carbon powder, the molded body containing 0.5 to 4 parts by weight of the carbon powder when the weight of the alumina powder is 100 parts by weight, the carbon powder having a primary particle size of 200 nm or less; and sintering the molded body in a nonoxidizing atmosphere to form the sintered body.

10. A method of manufacturing a sintered body according to claim 9, wherein the step of preparing the molded body yields a mixed powder by mixing an alumina powder and a carbon powder having a primary particle size of 200 nm or less, and attains the molded body by molding the mixed powder.

11. A method of manufacturing a sintered body according to claim 9, wherein the step of preparing the molded body yields a mixture by mixing an alumina powder and an organic matter, carbonizes the organic matter in the mixture by heat-treating the mixture in a nonoxidizing atmosphere, so as to form a carbon powder having a primary particle size of 200 nm or less, and attains the molded body by molding a mixed powder containing the carbon powder.

12. A method of manufacturing a sintered body according to claim 9, wherein the step of preparing the molded body yields a mixture by mixing an alumina powder and an organic matter, molds the mixture, and carbonizes the organic matter in the mixture by heat-treating the molded mixture in a nonoxidizing atmosphere, so as to form a carbon powder having a primary particle size of 200 nm or less, thereby attaining the molded body.

13. A method of manufacturing a sintered body according to claim 9, wherein the molded body further contains a titanium carbide powder having a primary particle size of 500 nm or less.

14. A method of manufacturing a sintered body according to claim 9, wherein the molded body further contains a titania powder having a primary particle size of 200 nm or less.

15. A method of manufacturing a sintered body according to claim 9, wherein the sintered body is used for a magnetic head slider.

* * * * *